United States Patent [19]

Takehara et al.

[11] 4,357,699
[45] Nov. 2, 1982

[54] CAPACITANCE DETECTION TYPE STYLUS WITH DIAMOND BODY AND ELECTRODE HAVING THE SAME WEAR RESISTANCE PROPERTIES

[75] Inventors: Hideaki Takehara; Yoshiyo Wada, both of Yokohama; Kunio Goto, Tokyo; Kyusaku Suga, Tokyo; Hitoshi Watanabe, Tokyo, all of Japan

[73] Assignees: Adamant Kogyo Co., Ltd., Tokyo; Victor Company of Japan, Limited, Yokohama, both of Japan

[21] Appl. No.: 247,489

[22] Filed: Mar. 25, 1981

[30] Foreign Application Priority Data

Mar. 26, 1980 [JP] Japan .................................. 55-38396
Mar. 26, 1980 [JP] Japan .................................. 55-38397

[51] Int. Cl.³ ............................................... G11B 3/44
[52] U.S. Cl. ...................................... 369/173; 369/126
[58] Field of Search ................ 369/173, 151, 144, 126

[56] References Cited

U.S. PATENT DOCUMENTS 3,781,020 12/1973 Batsch et al. ........................ 274/38
3,848,876 11/1974 Joschko et al. ..................... 369/173
3,877,705 4/1975 Joschko et al. ..................... 369/173

FOREIGN PATENT DOCUMENTS 2741162 3/1978 Fed. Rep. of Germany ...... 369/173
56-19502 2/1981 Japan ................................. 369/173

Primary Examiner—Steven L. Stephan
Attorney, Agent, or Firm—Pollock, Vande Sande & Priddy

[57] ABSTRACT

A stylus for detecting signals as electrostatic capacitance variations of the information recorded in the form of geometric variations on a disc record comprises a diamond body and a stylus electrode attached to one surface of the body which makes contact with the disc record. The electrode extends downward to the plane of the contact face of the diamond body to detect the recorded information. The crystallographic orientations of the diamond body are such that the contact face is inclined at a predetermined angle to a crystallographic plane having the tendency to wear substantially at the same rate as the wearing rate of the electrode at its downward tip so that the electrode keeps contact with the record surface for a long period of use.

7 Claims, 6 Drawing Figures

4,357,699

CAPACITANCE DETECTION TYPE STYLUS WITH DIAMOND BODY AND ELECTRODE HAVING THE SAME WEAR RESISTANCE PROPERTIES

BACKGROUND OF THE INVENTION

The present invention relates styluses for detecting signals stored in the form of geometric variations in a recording medium as capacitance variations, and in particular to a stylus including a diamond body having the same wear resistance property as the wear resistance property of the stylus electrode attached thereto.

Conventional styluses for use in detecting signals as electrostatic capacitance variations recorded as geometric variations in a recording medium such as grooveless disc have an electrode bonded to one surface of an insulative supporting body formed of diamond or sapphire. The stylus of this type rests over several spiral tracks in which the signals are recorded. The electrode is machined so that its width substantially corresponds to the width of the track to read one information signal and the tracking signals on either side of it to keep the stylus on the right path as the disc spins at a high speed.

However, it was found that the stylus electrode has the tendency toward wearing at a higher rate than the rate at which the diamond body wears on its contact face and as a result the downward tip of the electrode is spaced above the contact face of the diamond body after a period of use, thus degrading the operating performance of the stylus and imposing limitations on the useful lifetime of the stylus.

SUMMARY OF THE INVENTION

Accordingly, the primary object of the present invention is to provide a stylus of the capacitance detection type in which the diamond body and the stylus electrode have the tendency to wear at substantially the same rate to prolong the usable lifetime of the stylus. This is accomplished by cutting the diamond body so that its contact face which rests on a disc record, is inclined at a specified angle to a predetermined crystallographic plane having substantially the same rate of wear as that of the stylus electrode.

BRIEF DESCRIPTION OF THE INVENTION

The invention will be further described with reference to the accompanying drawings, in which.

DETAILED DESCRIPTION

Figure 1:
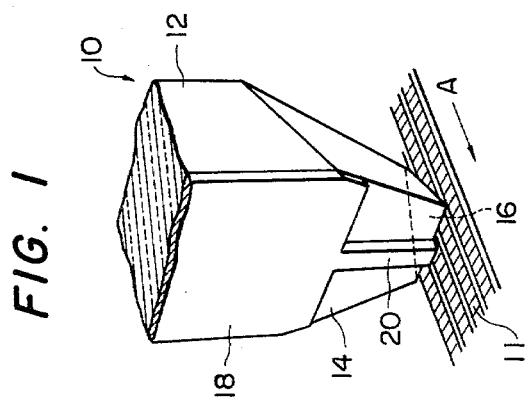
FIG. 1 is an illustration of a stylus of the present invention resting on several tracks of a disc record.

In FIG. 1 a reproducing stylus 10 for grooveless capacitance discs is shown as resting over several spiral tracks 11 of a disc in which signals are stored as capacitance variations produced by minute pits. The stylus 10 comprises a diamond body 12 which is shaped to form a rear face 14 and a contact face 16 making contact with the disc moving in the direction of the arrow A when in operation. The contact face 16 has a width covering several tracks as shown and takes a triangular shape, for example. On the rear face 14 of the stylus 10, which is preferably at about 90° to the contact face 16, is a stylus electrode 18 having a narrow strip 20 extending downwardly to a point which shares a common plane with the contact face 16. The strip portion 20 of the electrode 18 makes contact with one track to read just one information signal and the tracking signals on either side of it to keep the stylus 10 on the right path by feeding current to a tracking error servomechanism, not shown.

The stylus electrode 18 is preferably a conductive layer composed of a carbide compound. The carbon constituent of the compound is preferably one that forms part of the diamond body 12 and the conductive constituent is preferably one having a strong affinity to diamond. Examples of the conductive substance found suitable are hafnium, titanium or tantalum.

The crystallographic structure of the diamond body 12 is described by the Miller indices as is well known in the art. Accordingly to the invention, the diamond body 12 is cut so that the contact face 16 has a predetermined crystallographic plane whose wear resistance property is substantially equal to the wear resistance property of the electrode 18 adjacent to the contact face 16.

Figure 2:
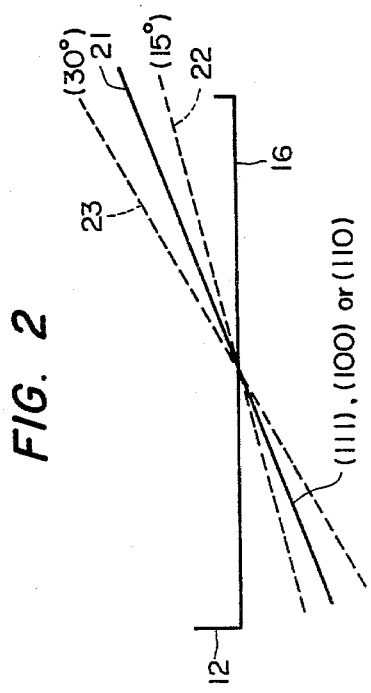
FIG. 2 is a sketch of a first embodiment of the invention in which the inclination of the contact face of the stylus of FIG. 1 to crystallographic planes is schematically illustrated.
Figure 3:
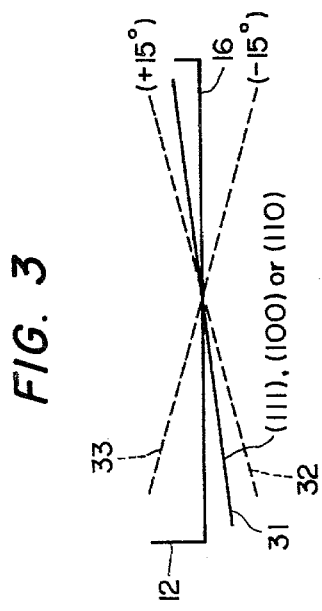
FIG. 3 is a sketch of a second embodiment of the invention illustrating other inclination angles of the contact face to crystallographic planes.

A first embodiment of the stylus 10 is schematically illustrated in FIG. 2 in which the contact face 16 of the diamond body 12 lies at an angle of from about 15° to 30° to the crystallographic plane (111), (100) or (110) or a crystallographically eqivalent plane thereof which is indicated at 21 as lying between broken lines 22 and 23 which are respective 15° and 30° to the contact face 16. The inclination angle of the above-mentioned crystal plane to the contact face 16 allows the electrode strip 20 and the diamond body 12 to have substantially the same as a function time when the stylus makes contact with the disc record spinning at high operational speed, so that the usable lifetime of the stylus can be lengthened considerably compared with the prior art stylus.

Figure 4A:
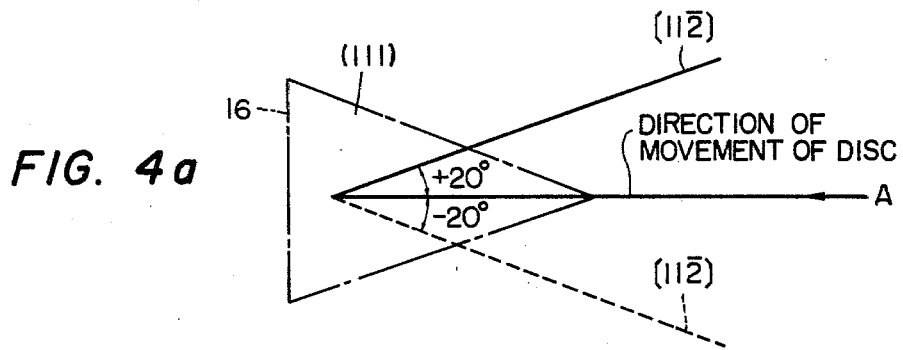
FIGS. 4a to 4c are sketches associated with FIG. 3 for illustrating orientations of crystallographic axes on different crystal planes of the contact face of the stylus.
Figure 4B:
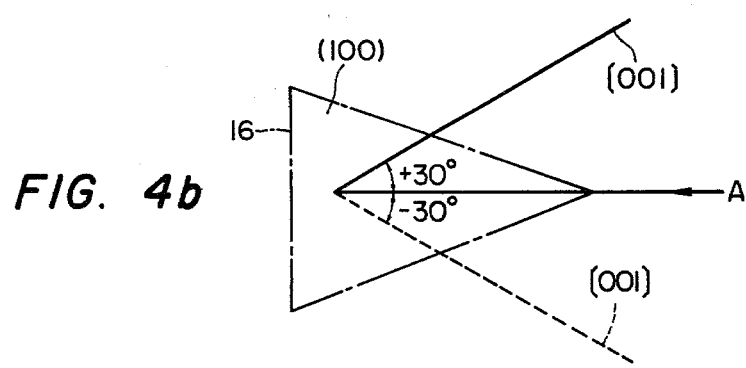
Figure 4C:
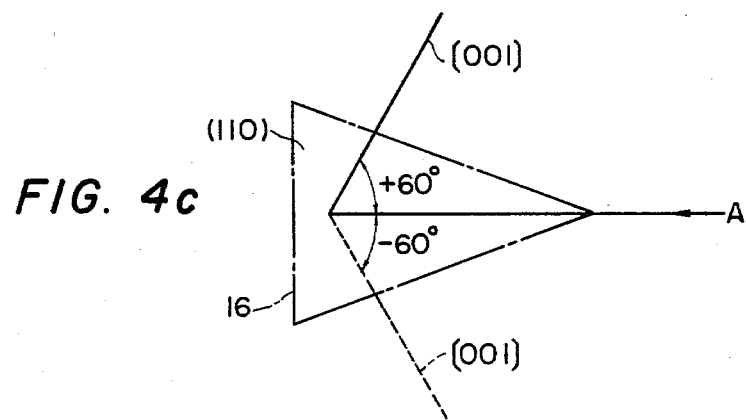

A second embodiment of the stylus 10 is schematically illustrated in FIGS. 3, 4a to 4c. In this embodiment, the contact face 16 lies at an angle within a range between about −15° and +15° to the crystallographic plane (111), (100) or (110) or a crystallographically equivalent plane thereof indicated at 31 lying between broken lines 32 and 33 which are respectively at −15° and +15° to the contact face 16. If the contact face 16 lies within ±15° to the crystal plane (111), or equivalent thereof, the [112] vector or axis in the plane (111) should lie within a range of angles from −20° to +20° to the direction of movement of disc indicated by arrow A, as illustrated in FIG. 4a. Alternatively, if the contact face 16 lies within ±15° to the crystal plane (100) or equivalent thereof, the [001] vector in the plane (100) should lie within a range of angles from −30° to +30° to the direction of arrow A, as shown in FIG. 4b. In addition, if the contact face 16 lies within ±15° crystal plane (110), or equivalent thereof, the [001] vector in the plane (110) should lie within a range of from −60° to +60° to the direction of arrow A, as shown in FIG. 4c.

What is claimed is:

1. A stylus for detecting signals recorded as geometric variations in a recording medium, comprising a body of diamond having a contact surface which rests on a plurality of tracks of said recording medium when in use and an electrode attached to a surface of said diamond body at an angle to said contact surface, said electrode extending toward said recording medium to share a common plane with said contact surface, said contact surface of said diamond body having a predetermined crystallographic plane whose wear resistance property is substantially equal to the wear resistance property of the portion of said electrode adjacent to said common surface plane, whereby said portion of said electrode and said contact surface of said diamond body have a tendency to wear at substantially the same rate.

2. A stylus as claimed in claim 1, wherein said contact surface of said diamond body lies at an angle in a range between an approximately 15° and 30° to one of the crystallographic planes (111), (100), (110) and an equivalent crystallographic plane thereof.

3. A stylus as claimed in claim 1, wherein said contact surface of said diamond body lies at angle in a range between approximately −15° and +15° to the crystallographic plane (111), said plane (111) having a crystallographic axis (112) or a crystallographically equivalent axis thereof which lies at an angle of approximately 20° to the direction of relative movement between said stylus and said recording medium.

4. A stylus as claimed in claim 1, wherein said contact surface of said diamond body lies at angle in a range between approximately −15° to +15° to the crystallographic plane (100), said plane (100) having a crystallographic axis [001] or a crystallographically equivalent axis thereof which lies at an angle of approximately 30° to the direction of relative movement between said stylus and said recording medium.

5. A stylus as claimed in claim 1, wherein said contact surface of said diamond body lies at an angle in a range between approximately −15° to +15° to the crystallographic plane (110) or a crystallographically eqivalent axis thereof, said plane (110) having a crystallographic axis [001] which lies at an angle of approximately 60° to the direction of relative movement between said stylus and said recording medium.

6. A stylus as claimed in any one of the preceding claims, wherein said electrode comprises a conductive layer of a carbide compound.

7. A stylus as claimed in claim 6, wherein said carbide compound is hafnium carbide, titanium carbide or tantalum carbide.

* * * * *